(No Model.)

A. T. SULLIVAN.
ANIMAL TRAP.

No. 575,792. Patented Jan. 26, 1897.

WITNESSES:
M. C. Fletcher
H. G. MacLean

INVENTOR
Alonzo Taylor Sullivan
BY
Clark Deement & Co.
ATTORNEYS

UNITED STATES PATENT OFFICE.

ALONZO TAYLOR SULLIVAN, OF MALCOLM, NEBRASKA.

ANIMAL-TRAP.

SPECIFICATION forming part of Letters Patent No. 575,792, dated January 26, 1897.

Application filed March 7, 1896. Serial No. 582,180. (No model.)

*To all whom it may concern:*

Be it known that I, ALONZO TAYLOR SULLIVAN, a citizen of the United States, and a resident of Malcolm, county of Lancaster, and State of Nebraska, have invented certain new and useful Improvements in Animal-Traps, of which the following is a specification, reference being had to the accompanying drawings, forming a part thereof, in which similar letters and figures of reference indicate corresponding parts.

This invention relates to improvements in animal-traps, the object of the invention being to supply an article of this character which is operative, simple in construction, inexpensive, and durable.

The invention will be hereinafter fully described, and specifically set forth in the annexed claim.

Figure 1:
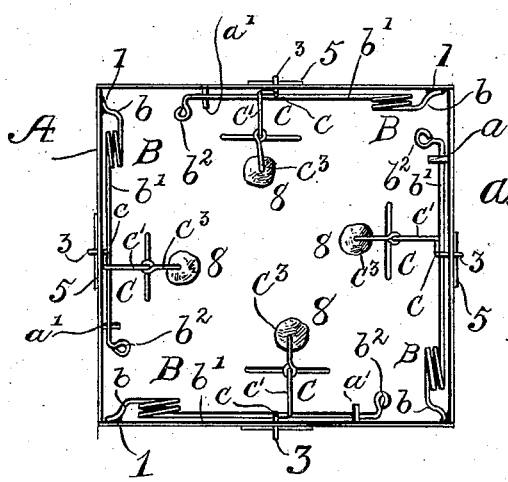
Figure 2:
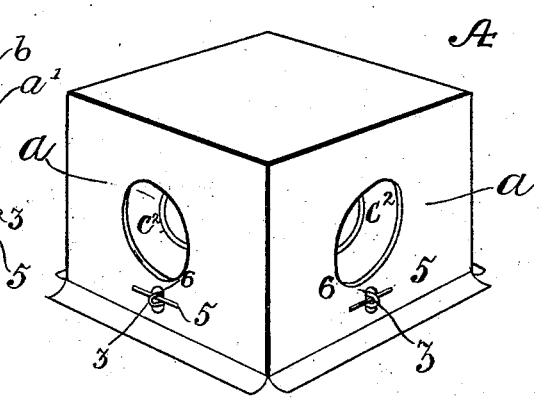
Figure 3:
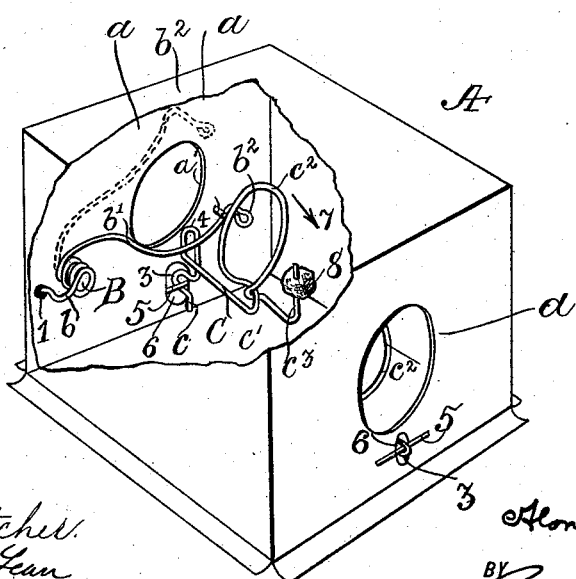

In the accompanying drawings, forming part of this specification, Figure 1 is an inverted plan view of my improved trap. Fig. 2 is a perspective view thereof, and Fig. 3 is a perspective view showing a portion of the walls or casing of the trap broken away.

In the practice of my invention I provide a hollow casing A, which may be of any desired shape, but which is preferably square and is composed of sheet metal. Through the walls of the said casing I provide apertures $a$ as a means of ingress for the animals to be caught by the trap. Upon the inner walls of the said casing A, I provide normally-expanded spiral springs B. These said springs are provided with extended arms $b$ and $b'$, the arms $b$ being securely fastened to the walls by means of drops of solder 1. The arms $b'$, being free, will extend normally in an upward direction, as illustrated by dotted lines in Fig. 3, but they will not contact with the upper wall of the casing. Projected inwardly from the said arms $b'$, I provide looped portions $b^2$, adapted to be used as thumb-pieces in operating the springs.

Pivotally attached to the walls of the casing beneath the openings $a$ are angular trip-levers C, which said levers comprise upright portions $c$, having loops 3 and 4, forming part thereof, the loops 3 being in engagement with the rods 5, which are secured to the outer walls of the casing, the said loops 3 passing outwardly through apertures 6 in the side walls of the casing, whereby the levers are fulcrumed and free to move to a limited extent in the direction of the arrow 7.

Projected from the loops 4 at right angles with the rods $c$ are rods $c'$, which terminate in upwardly-extended rings $c^2$, which rings have forks $c^3$ projected therefrom, the said forks being adapted to receive morsels of bait for attracting the animals. Projecting inwardly from the said walls of the casing A are small pins $a'$, which are adapted to engage with the arms $b'$ of the springs B when the trap is being set.

In the operation of the device the arms $b'$ of the springs B are forced downwardly until they pass over the loops 4 of the angular levers C and under the pins $a'$ of the walls of the casing, as illustrated by full lines of Fig. 3 of the drawings. The forks are then baited with any suitable article of food 8 and the trap is ready to be operated, as follows:

After setting and baiting the trap it will be placed in any suitable location, and an animal in endeavoring to reach the bait will extend a portion of its body through one of the apertures $a$ of the casing, which aperture, being of a large diameter, admits of an animal passing therethrough very readily, but in order to reach the bait the animal must also pass through the ring $c^2$ of the angular lever C, and this said ring, being of a diameter much smaller than the opening $a$, will prevent the animal's body from passing therethrough, and in an endeavor to do so said animal will push the lever C in the direction of the arrow 7 to a sufficient degree to release the arm $b'$ of the spring B, which arm will immediately spring up and tightly clamp the animal against the upper edge of the opening $a$ and hold it there securely.

In constructing the operative portions of my device I prefer to use bent wire in order to lessen the cost of manufacture, but I do not confine myself to the specific details of construction as herein shown and described.

Having thus described my invention, what I claim as new, and desire to secure by Letters Patent, is—

An animal-trap comprising a casing having apertures through the walls thereof, spring-pressed choking rings or loops upon the inner surface of the said casing, inwardly-projecting pins adapted to engage the said choking rings or loops, in combination with the angular trip-levers C, comprising upright portions c, having loops 3 and 4, and rods 5, the said loops 3 passing outwardly through apertures 6 in the side walls of the casing whereby the levers are fulcrumed and free to move to a limited extent.

In testimony that I claim the foregoing as my invention I have signed my name, in presence of two witnesses, this 3d day of March, 1896.

ALONZO TAYLOR SULLIVAN.

Witnesses:
B. D. HOTCHKISS,
WM. BEESON.